US008208737B1

(12) United States Patent
Ie

(10) Patent No.: US 8,208,737 B1
(45) Date of Patent: Jun. 26, 2012

(54) METHODS AND SYSTEMS FOR IDENTIFYING CAPTIONS IN MEDIA MATERIAL

(75) Inventor: Eugene Ie, Cupertino, CA (US)

(73) Assignee: Google Inc., Mountain View, CA (US)

( * ) Notice: Subject to any disclaimer, the term of this patent is extended or adjusted under 35 U.S.C. 154(b) by 636 days.

(21) Appl. No.: 12/425,500

(22) Filed: Apr. 17, 2009

(51) Int. Cl.
  *G06K 9/72* (2006.01)
(52) U.S. Cl. ........ 382/229; 382/176; 382/180; 382/175; 382/195; 382/291; 382/292
(58) Field of Classification Search .................. 382/176, 382/180, 229, 175, 195, 291, 292
  See application file for complete search history.

(56) References Cited

U.S. PATENT DOCUMENTS

| | | | | |
|---|---|---|---|---|
| 5,335,290 | A | * | 8/1994 | Cullen et al. .................. 382/176 |
| 6,173,275 | B1 | * | 1/2001 | Caid et al. ........................ 706/14 |
| 6,327,387 | B1 | * | 12/2001 | Naoi et al. ..................... 382/190 |
| 7,099,507 | B2 | * | 8/2006 | Ouchi ............................ 382/173 |
| 2003/0152277 | A1 | * | 8/2003 | Hall et al. ..................... 382/229 |
| 2006/0104511 | A1 | * | 5/2006 | Guo et al. ..................... 382/176 |
| 2008/0002916 | A1 | * | 1/2008 | Vincent et al. ................ 382/305 |
| 2009/0087094 | A1 | * | 4/2009 | Deryagin et al. ............. 382/180 |

OTHER PUBLICATIONS

"Technical Standards for Digital Conversion of Text and Graphic Materials", Library of Congress, 1995, 28 pages.
Adams, J.F., "How to Scan a Book", Proportional Reading, 1996, retrieved from http://www.proportionalreading.com/scan.html, retrieved on Sep. 18, 2008, 14 pages.
Reilly, J.M., et al., "Recommendations for the Evaluation of Digital Images Produced from Photographic, Microphotographic, and Various Paper Formats", Report to the Library of Congress National Digital Library Project: Contract # 96CLCSP7582, 1996, 40 pages.

* cited by examiner

*Primary Examiner* — Wesley Tucker
*Assistant Examiner* — Mark Roz
(74) *Attorney, Agent, or Firm* — Sterne, Kessler, Goldstein & Fox P.L.L.C.

(57) ABSTRACT

The present invention relates to systems and methods for identifying captions associated with images in media material. A captioner includes a selector module and a caption identifier module. The selector module identifies text-blocks potentially associated with images in the media material. The caption identifier module identifies which text-blocks are captions associated with images in the media material, based on the textual and proximity features of the text-block and the images. The captioner may also include a caption feedback module to modify the determining of the caption identifier module.

6 Claims, 16 Drawing Sheets

761 — Ergebnisse aus den Beobachtungen der meteorologischen Station zu Dresden in den Jahren 1848—1888.

762 — [table data]

761 —

762 — THE LIBRARY OF THE UNIVERSITY OF CALIFORNIA

PRESENTED BY
PROF. CHARLES A. KOFOID AND
MRS. PRUDENCE W. KOFOID

METHODS AND SYSTEMS FOR IDENTIFYING CAPTIONS IN MEDIA MATERIAL

BACKGROUND

1. Technical Field

Embodiments of the present invention relate to computer-aided analysis of media material.

2. Related Art

Computers are increasingly being used to perform or aid the analysis of documents and printed material. Layout analysis techniques and systems have been used to analyze the location, relative arrangement and relationship of text and images in a document. Such document layout analysis can be important in many document imaging applications. For example, document layout analysis can be used to identify the location and relative arrangement of captions and associated images in a media material. Caption identification, based on existing techniques, generally works best on simple documents, but may be difficult or even unworkable when caption placements are complex or variable. For instance, traditional automated or semi-automated document layout analysis often fails on complex layouts and resort must be made to manual analysis.

Providing reliable caption identification across a broad variety of layouts creates special challenges. Simple optical character recognition (OCR) based attempts to detect image captions are often inadequate and frequently fail to identify the correct caption. For example, to identify captions for a reader, media material creators may use a variety of features—such as type fonts, capitalization, specific identifying tag words and abbreviations (e.g., fig., figure, caption), type sizes, type styles (boldface, italics, underline, etc.) and caption position relative to the image. Each piece of media material may use a different combination of these features, and also may have different caption identification features in use simultaneously. Traditional methods of caption identification do not analyze the multitude of different textual, proximity and content features available to assist in an accurate identification of captions.

Automated methods of identifying captions have generally relied on text position, document layouts and other proximity features alone and hence make many mistakes, as there is no consistent, adaptive method of identifying captions that works across a wide variety of media material. Such limited automated methods have further difficulty analyzing captions and images that continue across two or more pages of a media material.

What is needed are improved systems and methods for identifying captions in media material.

BRIEF SUMMARY

Embodiments of the present invention relate to systems and methods for identifying captions associated with images in media material. According to an embodiment, a computer-implemented captioner for analyzing data representative of image captions in media material includes a selector module that identifies text-blocks potentially associated with images in the media material and a caption identifier module that determines which ones of the identified text-blocks are captions associated with one or more identified images in the media material based on features of the text-blocks and the images. The captioner may further include a caption feedback module to process feedback about determined captions, and this processed feedback may be used to modify the determining of the caption identifier module.

According to another embodiment, a computer-implemented method for analyzing data representative of image captions is provided. The method includes identifying the text-blocks potentially associated with images in media material, and electronically determining, for each identified text-block, whether it is a caption of one or more images in the media material based on features of the text-blocks and the images. The method further includes storing information corresponding to the linkages between the determined captions and their associated images. According to another embodiment, the computer-implemented method for analyzing data representative of image captions may further include accepting feedback about determined captions and using the feedback to modify the determining stage.

Further features and advantages, as well as the structure and operation of various embodiments are described in detail below with reference to the accompanying drawings. The drawing in which an element first appears is typically indicated by the leftmost digit in the corresponding reference number.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Overview
Captioner
    Image and Caption Candidate Selection
    Generating a Caption Score
    Example Equations
    Identifying Captions and Storing
    Feedback
Example Computer System Implementation
Conclusion
Overview Embodiments of the present invention relate to the identification of captions in media material using computer-aided analysis. While specific configurations, arrangements, and steps are discussed, it should be understood that this is done for illustrative purposes only. A person skilled in the pertinent art will recognize that other configurations, arrangements, and steps may be used without departing from the spirit and scope of the present invention. It will also be apparent to a person skilled in the pertinent art that these embodiments may also be employed in a variety of other applications.

It should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art given this description to incorporate such a feature, structure, or characteristic in connection with other embodiments whether or not explicitly described.

The term "media material" may include media material having a layout with images, and having captions describing or related to these images. Such examples include, but are not limited to, books, newspapers, magazines, catalogues, brochures, pamphlets, and other types of print media or electronic media. Other eligible types of media material would be apparent to a person skilled in the art given this description. Archival representations of media material may be also scanned from an archived format.

The term "images" is used herein to broadly describe images in media material, e.g., text figures, pictures, graphics, illustrations, line drawings, logos, seals, photographs or diagrams. Other image content would be apparent to a person skilled in the art given this description. In media material, most images have some sort of explanatory material to make them understandable to the reader. This explanatory material may be supplied by a caption, placed in the media material in proximity to an image. The term "caption" is used broadly herein to describe a text block of one or more alphanumeric or symbolic characters that are placed on the same page, or on an adjacent or nearby page with an image, and that is relevant to that image. For example a caption may be a title, legend, identifying tag, short explanation, description, or comment, associated with, descriptive of, or relevant to an image.

Captioner

Figure 1A:
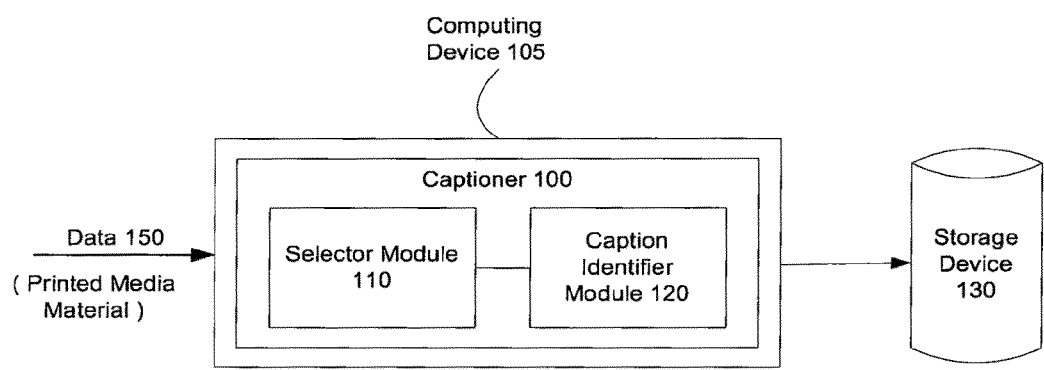
FIG. 1A is a diagram of a captioner according to an embodiment of the present invention.

FIG. 1A is a diagram of a captioner 100 according to an embodiment of the present invention. Captioners may be used to analyze the placement, content and relative arrangement of text blocks that could be captions, i.e., caption candidates, and their associated or "target" images in media material, and thereby determine which potential captions are associated with which images. Captioner 100 is computer-implemented, and as described further below in the discussion of FIG. 11, operates on a computing device 105. Captioner 100 includes a selector module 110, and a caption identifier module 120. The selector module 110 may be used to identify an initial set of candidate text-blocks potentially associated with one or more images in media material. One of many possible approaches that could be used by the selector 110, as would be apparent to a person skilled in the art, is the approach of analyzing the proximity features of text-blocks relative to one or more images. This approach will be described further in embodiments herein, but other approaches may be used without departing from the spirit and scope of the present application. The caption identifier module 120 may be used to determine which ones of the identified text-blocks are captions associated with the images in media material. Captioner 100 may be coupled to a storage device 130. The storage device 130 may be used to store information corresponding to the linkages between the determined captions and their associated images. Captioner 100 may receive or access media material in data 150. Data 150 may include electronic or scanned image data and optical character recognition (OCR) data extracted from scanned image data. Data 150 may be provided in any type of file format.

Figure 10:
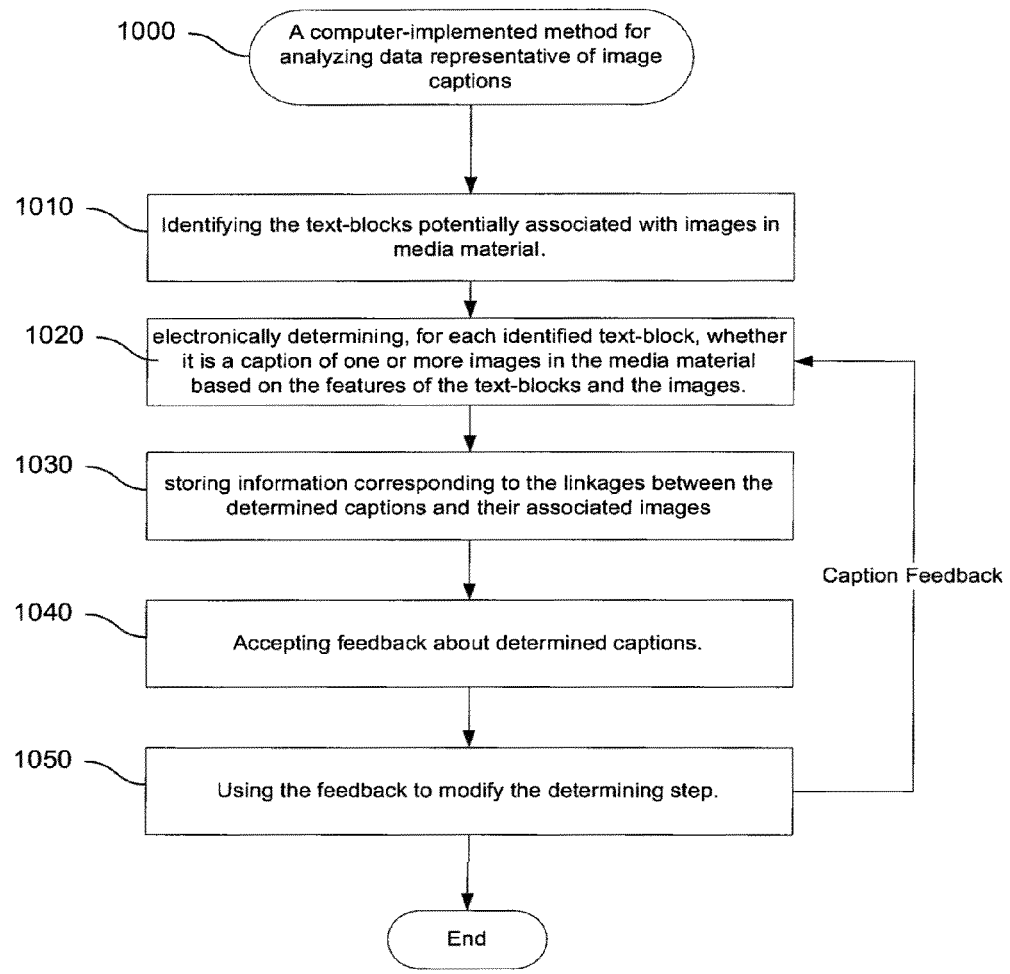
FIG. 10 is a diagram that shows computer-implemented method for analyzing data representative of image captions according to an embodiment of the present invention.

According to a further embodiment, FIG. 10 is a flowchart depicting a computer-implemented method for analyzing data representative of image captions 1000 according to an embodiment of the present invention. For brevity, method 1000 is described below with reference to captioner 100 but is not necessarily intended to be limited to the structure of captioner 100.

According to an embodiment of the present invention, selector module 110 selects caption candidates and images from media material in data 150, and outputs pairs of caption candidates and associated images. This operation of selector module 110 is discussed further with FIGS. 2A and 5 below. In an embodiment, the function of selector module 110 corresponds to stage 1010 in a computer-implemented method for analyzing data representative of image captions 1000, as shown in FIG. 10. Once the selector module 110 has identified image caption candidate pairs, the caption identifier module 120 may identify which ones of the selected caption candidates are likely captions of their paired image, based on an analysis of the textual features of the selected caption candidates, the textual features of identified non-caption text, and the proximity of the caption candidates relative to the selected images and other similar criteria. This operation of caption identifier module 120 is discussed further with FIG. 6 below. In an embodiment, the function of caption identifier module 120 corresponds to stage 1020. Identified caption pairs may then be stored in storage device 130, this operation being described, in an embodiment at stage 1050.

According to an embodiment of the present invention, captioner 100 may also display images of scanned data 150 or data previously output from captioner 100. Output data for display may include displays of the media material analyzed to show the identified captions according to the analysis of captioner 100. Other types of information may be displayed as would be apparent to a person skilled in the art given this description.

Figure 11:
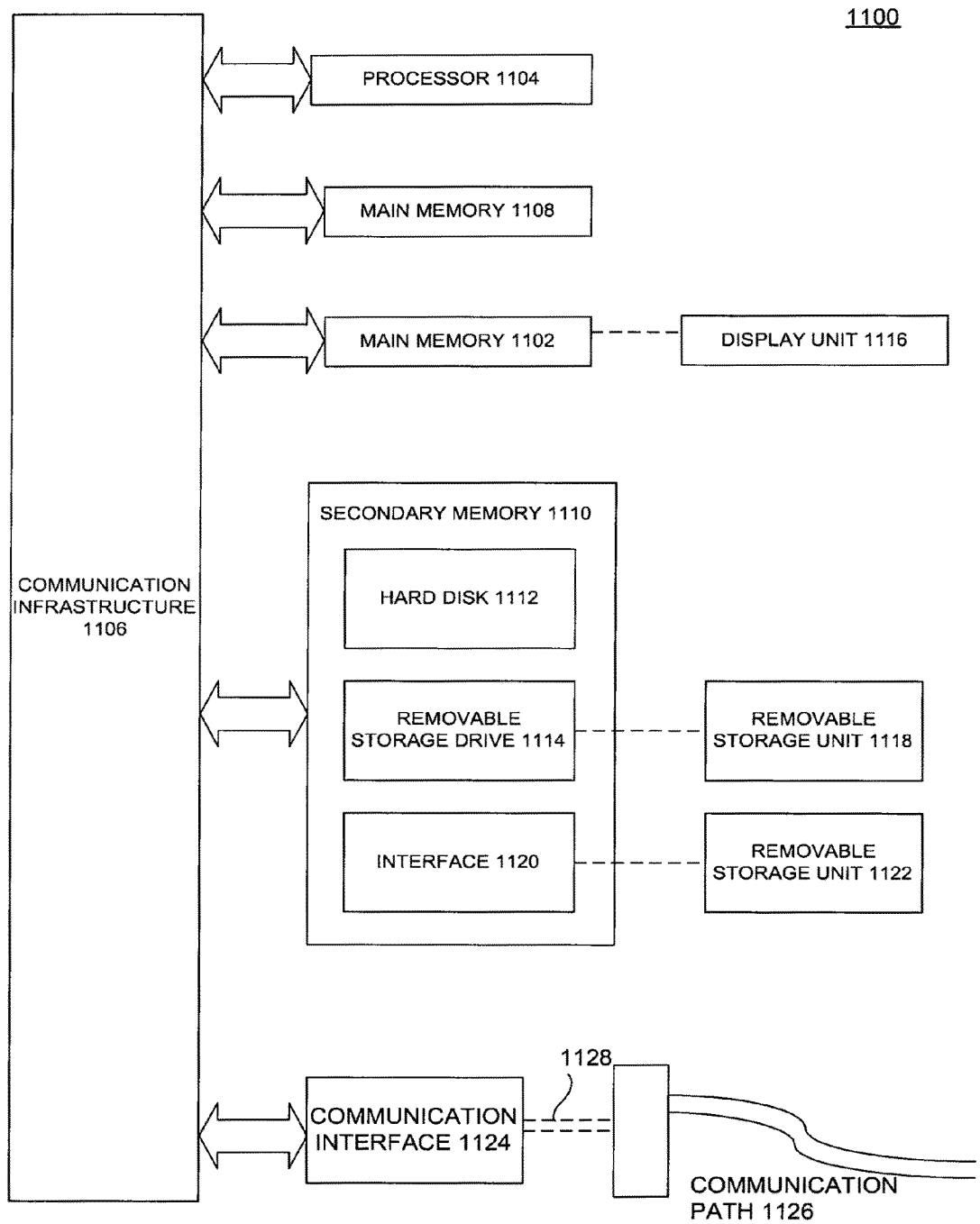
FIG. 11 is a diagram of an example computer system that may be used to implement an embodiment of the present invention.

Captioner 100 (including its component modules), as described further in the discussion of FIG. 11 below, can be implemented in software, firmware, hardware, or any combination thereof, including the distribution of functions across several linked or clustered computers. As will be discussed further, in embodiments, captioner 100 may be implemented to run on any type of processing device including, but not limited to, a computer, workstation, distributed computing system, embedded system, stand-alone electronic device, networked device, mobile device, set-top box, television, or other type of processor or computer system.

According to embodiments of the present invention, captioner 100 may also be used in a variety of applications. Captioner 100 may analyze stored image data, such as, archived media material, e.g., microfiche, film and other storage media may be scanned to obtain image data for input. Electronic files in any file format may also be input as source data. The analysis may be carried out automatically or semi-automatically with minimal or no input from a user. In this way, captioner 100 may be used to identify captions associated with images for a variety of media, whether current or archived. As would be apparent to a person skilled in the art given this description, by operating automatically or semi-automatically on data 150, a plurality of captioners 100 may be used and scaled to analyze and store image and caption information for large amount of media material.

Captioner 100, according to additional embodiments of the present invention, may output identified caption pairs to other applications, such as a searchable index. Such output may also be delivered to users wishing to review or search the contents of media material. In this way, images and captions in the media material may be made available locally and remotely over networks to a wide range of users. Captioner 100 may allow users to access images and associated captions in media material either locally or remotely at libraries, universities, government agencies, businesses, and other sites. Captioner 100 may also be used in connection with a search engine, web portal, or other web sites to allow remote users to review and search for images and captions in media material.

Figure 1B:
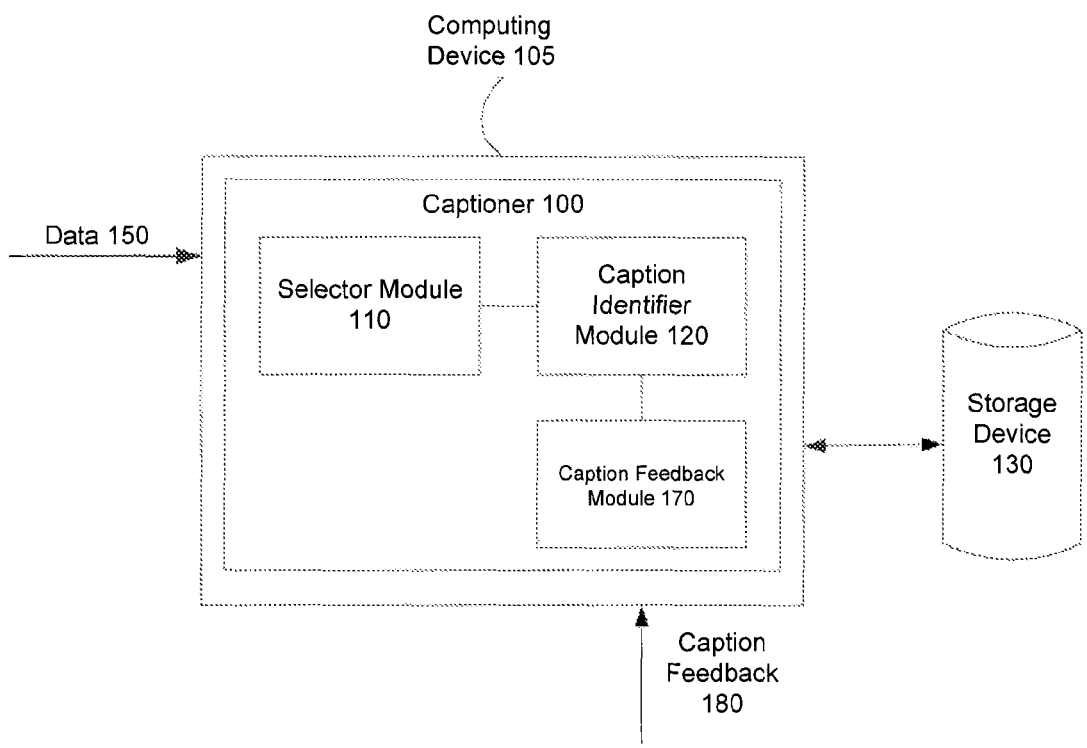
FIG. 1B is a diagram of a captioner with a caption feedback module according to another embodiment of the present invention.

FIG. 1B is a diagram of a captioner 100 according to another embodiment. Captioner 100 may include a caption feedback module 170. In embodiments, caption feedback module 170 may collect and process feedback associated with identified caption pairs. This collected feedback may then be used to modify the caption determination process applied to other similar or dissimilar media material. In embodiments, this feedback may act to improve the accuracy of caption determination for similar types of media material. Further description of embodiments that include feedback are described below with respect to FIGS. 4 and 7A-7D.

Image and Caption Candidate Selection

Figure 2A:
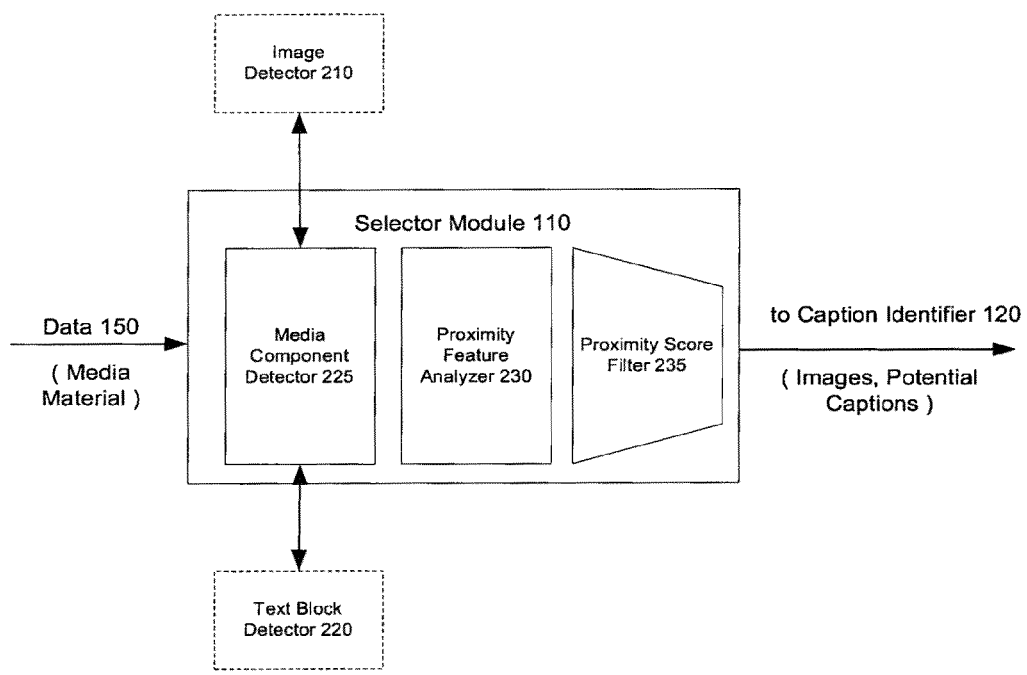
FIG. 2A is a diagram of a selector module according to an embodiment of the present invention.
Figure 5:
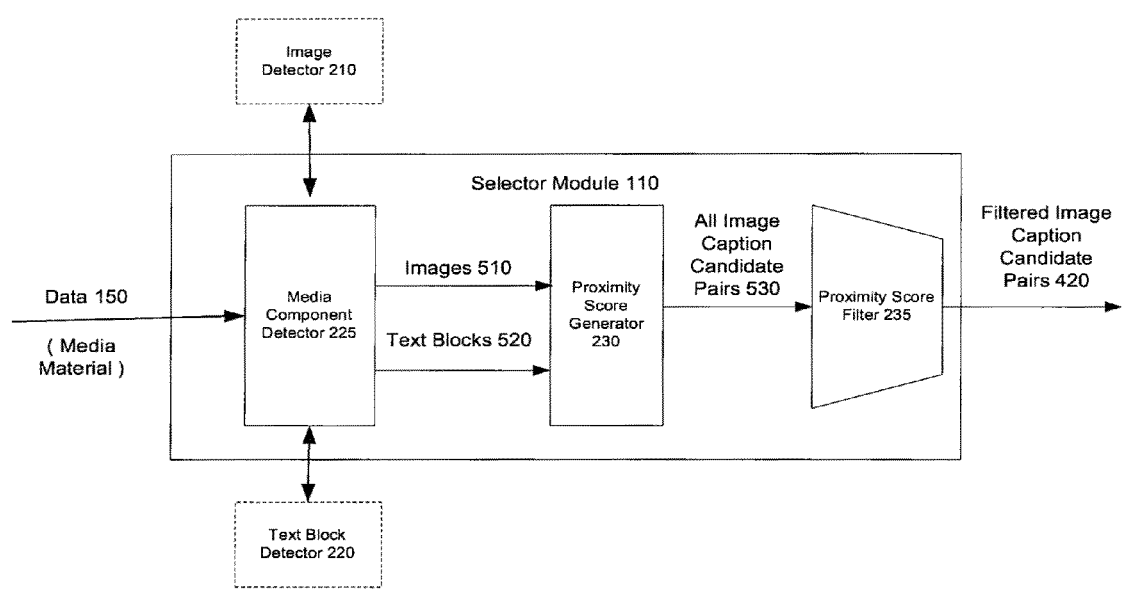
FIG. 5 is an illustration of the data flow within the selector module according to an embodiment of the present invention.

FIG. 2A illustrates a more detailed view of the selector module 110 according to an embodiment of the present invention. Selector module 110 includes a media component detector 225, a proximity feature analyzer 230 and a proximity score filter 235. Selector module 110 may also be communicatively coupled to two external components: an image detector 210 and a text block detector 220. The selector module 110 shall now be described in greater detail with reference to a data flow diagram as shown in FIG. 5 and the method described in FIG. 10.

In an embodiment, selector module 110 may receive or access data 150. In embodiments, media component detector 225 receives data 150 and sends it to an image detector 210 and a text block detector 220. As would be apparent to a person skilled in the relevant art, image detector 210 could use any one or combination of image detection and placement approaches. Such components typically analyze material to identify images and their placement within the material. Once the images have been identified in the media material, information corresponding to these images and their placement may be sent back to media component detector 225.

As also would be apparent to a person skilled in the relevant art, text block detector 210 could use any one or combination of text block detection approaches. An example component that performs text block identification may use established text block segmenter technology. Other approaches to text block detection would be apparent to a person skilled in the relevant art. In another embodiment, the text block detector also may determine a classification for the identified text, e.g., body text, heading text, or potential caption text. Once the text blocks have been identified in the media material, information corresponding to these text blocks and their placement on the media page may be sent back to media component detector 225.

Figure 9:
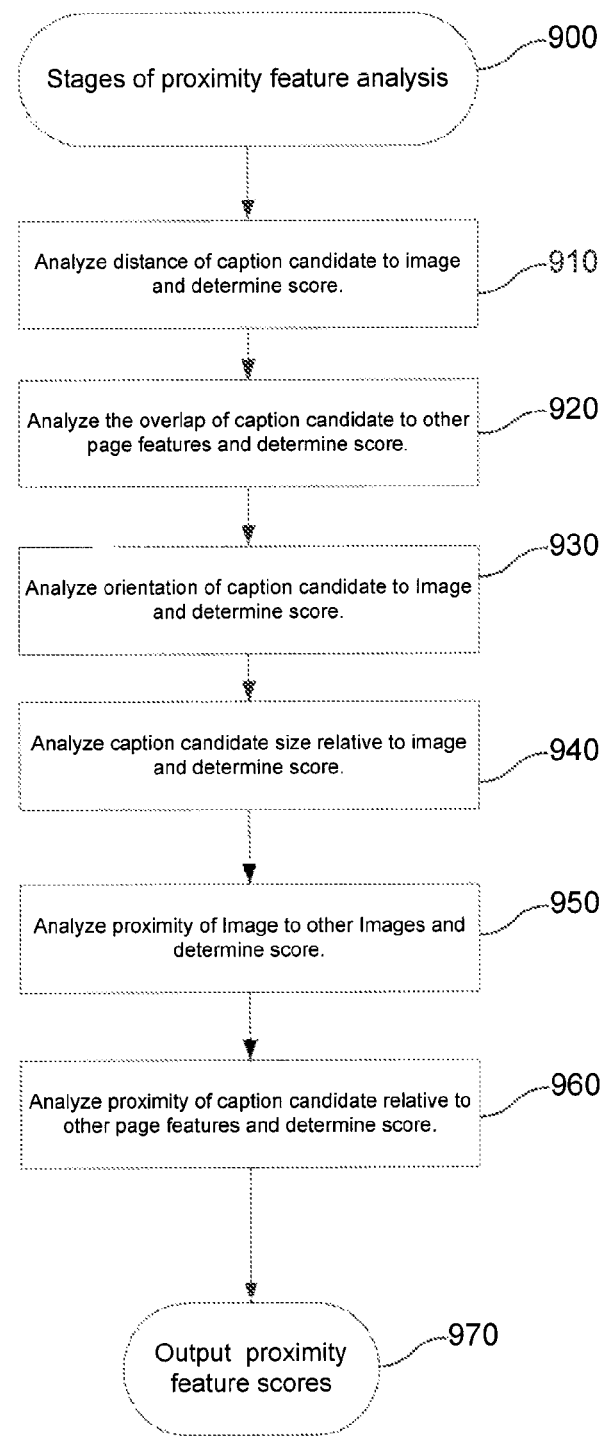
FIG. 9 is a diagram that shows example stages of proximity feature analysis, according to an embodiment of the present invention.

In an embodiment, proximity feature analyzer 230 determines one or more proximity scores 535 for each text block relative to each detected image based on the relative proximity and orientation of the text block to the analyzed image, and other page features, such as identified heading text or body text. These proximity features analyzed are described further in the discussion of FIG. 2C below, and an example flowchart depicting the stages of proximity feature analysis 900 as illustrated in FIG. 9. In a further embodiment, each set of generated proximity scores 535 are forwarded, with their associated text block and image pairs, to the caption identifier module 120, for use in determining a caption score for each pair. These text block and image pairs outputted by the proximity feature analyzer 230 will now be referred to herein as "image caption candidate pairs."

In an embodiment, the proximity feature analyzer 230 outputs all image caption candidate pairs 530 with their associated proximity scores 535 directly to caption identifier module 120. In another embodiment, proximity score filter 235 receives all image caption candidate pairs 530, and selects one or more image caption candidate pairs based on the proximity scores 535 of each. These filtered image caption candidate pairs 420 may then be forwarded to caption identifier module 120. In an additional embodiment, the proximity score filter 235 may select only a portion of the image caption pairs corresponding to a top number of scores, e.g., the top 10 pairs per page. In another embodiment, the proximity score filter 235 may take all pairs having proximity scores 535 above a specified or determined threshold, e.g., all pairs where the proximity scores 535 are above 20.

Figure 2B:
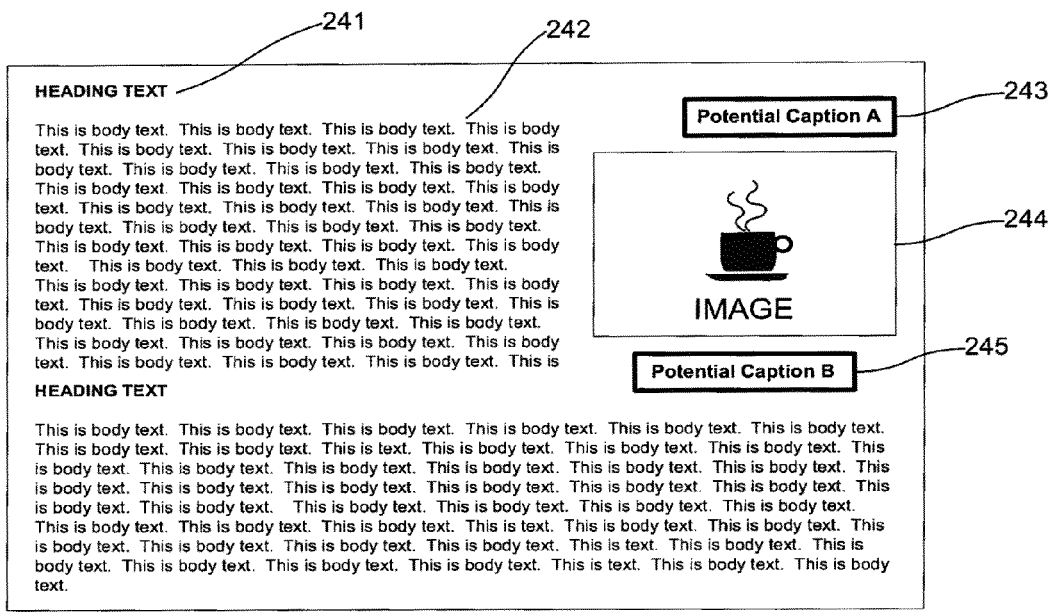
FIG. 2B is a diagram of a media page containing example heading text, body text, potential captions and an image according to an embodiment of the present invention.

FIG. 2B illustrates detection aspects that may be performed by text block detector 220. In an embodiment, the text block detector 220 may differentiate between at least four different page features of the media material, including: body text, heading text, text blocks 520 and images 510. 'Body text' has a definition well-used in the art: text that makes up the main body of an article rather than headlines, subheads, titles, or image captions. 'Heading text'—headlines, subheads, titles—also has a definition well-known in the art: text that is not body text, and is used to introduce, for example, chapters, sections, and other portions of the media material. In an embodiment, the text block detector 220 may distinguish between the body text, heading text, text blocks 520 and images 510, and analyze these further in successive stages of the captioner process. For example, in FIG. 2B, data 150 may include a media material page 240 containing heading text 241, body text 242, potential captions 245, 243 and an image 244. Image detector 210 detects image 244, and text block detector 220 detects caption candidates 243 and 245. In another example, text block detector 220 may not differentiate between text blocks 241, 242, 243 and 245, considering them text blocks that are all potentially caption candidates.

Figure 2C:
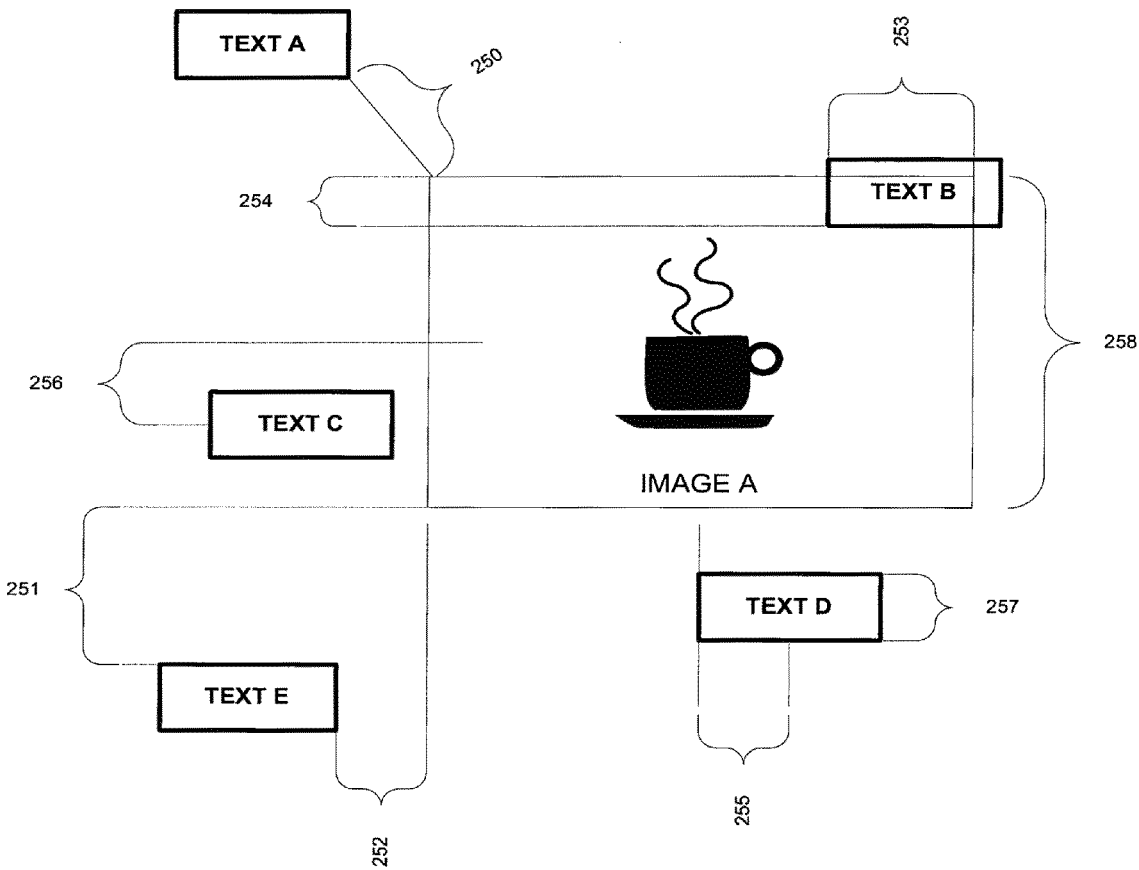
FIG. 2C is a diagram of the placement of potential captions and an image on a media page.

FIG. 2C illustrates various proximity features analyzed by the proximity feature analyzer 230. An example flowchart depicting the stages of proximity feature analysis 900 is also illustrated in FIG. 9, and this figure will be referenced in this section. The diagram in FIG. 2C shows five identified potential captions (TEXT A, B, C, D and E) for Image A. In an embodiment, proximity feature analyzer 230 evaluates one or more of the following proximity features for each of the text blocks relative to the image:

P1. The straight-line distance 250 between each detected image 510 and each text block 520, the determination of which as may be performed in stage 910 of the stages of proximity feature analysis 900. In another example, this value may be determined from different points on the caption or the image, e.g., from the center of the caption to the center of the image.

P2. The vertical distance 251 between each detected image 510 and each text block 520, the determination of which as also may be performed in stage 910. In another example, this value may be calculated from different points on the caption or the image, e.g., from the center of the caption to the center of the image.

P3. The horizontal distance 252 between each detected image 510 and each text block 520, the determination of which as also may be performed in stage 910. In another example, this value may be calculated from different points on the caption or the image, e.g., from the center of the caption to the center of the image.

P4. The amount of caption candidate horizontal overlap 253 of the image 510 analyzed, the determination of which as may be performed in stage 920.

P5. The amount of text block 520 vertical overlap 254 of the image analyzed 510, the determination of which as may be performed in stage 920.

P6. The deviation of the center point of the text block 520 from the horizontal center 255 of the image 510, the determination of which as may be performed in stage 930.

P7. The deviation from the vertical center 256 of the text block 520 and the analyzed image 510, the determination of which as may be performed in stage 930.

P8. The relative position of the text block 520 to the analyzed image 510, right, left, top, bottom, the determination of which as may be performed in stage 930.

P9. The relative total size of the text block 520 area to the area of the image 510 analyzed, the determination of which as may be performed in stage 940.

P10. The relative size of the box height of the caption candidate 257 to the box height size of the image analyzed 258, the determination of which as may be performed in stage 940.

P11. The proximity of the analyzed text block 520 to other text blocks, the determination of which as may be performed in stage 960.

P12. The proximity of the text blocks 520 to likely non-caption candidates, e.g., the proximity relationship of a text block 520 to an identified heading, the determination of which as may be performed in stage 960.

P13. The proximity of the image 510 to other images, the determination of which as may be performed in stage 950.

These examples of features P1-P13, and the stages of proximity feature analysis 900, are illustrative and not intended to limit the invention. As would be apparent to a person skilled in the art given this description, other proximity aspects, characteristics and features may be used to analyze caption candidates, headings, images and other page features so as to help identify potential captions.

As described above, in an embodiment, these generated proximity scores 535 may be used by proximity score filter 235 to limit the image caption candidate pairs sent to the caption identifier. In addition, as will be discussed below, these generated proximity scores 535 may be forwarded with the filtered image caption candidate pairs 420 to the caption identifier module 120, where they may be used as a factor in the determination of a caption score for the image caption candidate pair.

Generating a Caption Score

Figure 3:
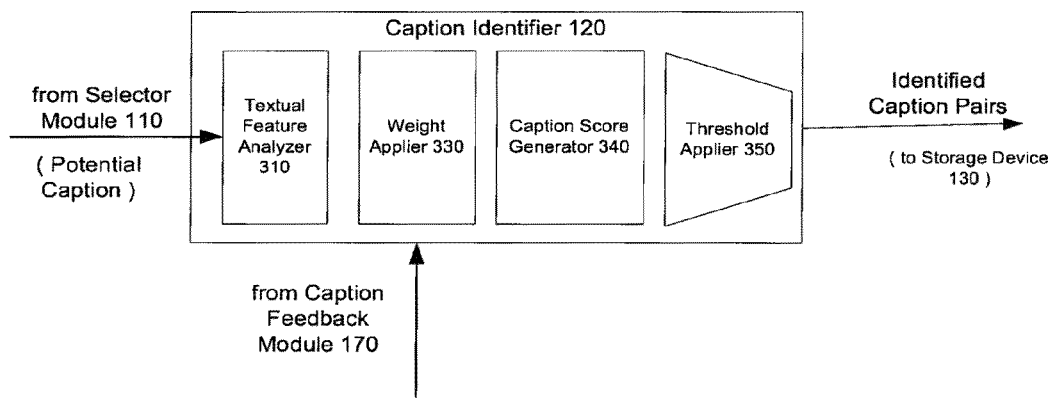
FIG. 3 is a diagram of a caption identifier module according to an embodiment of the present invention.
Figure 6:
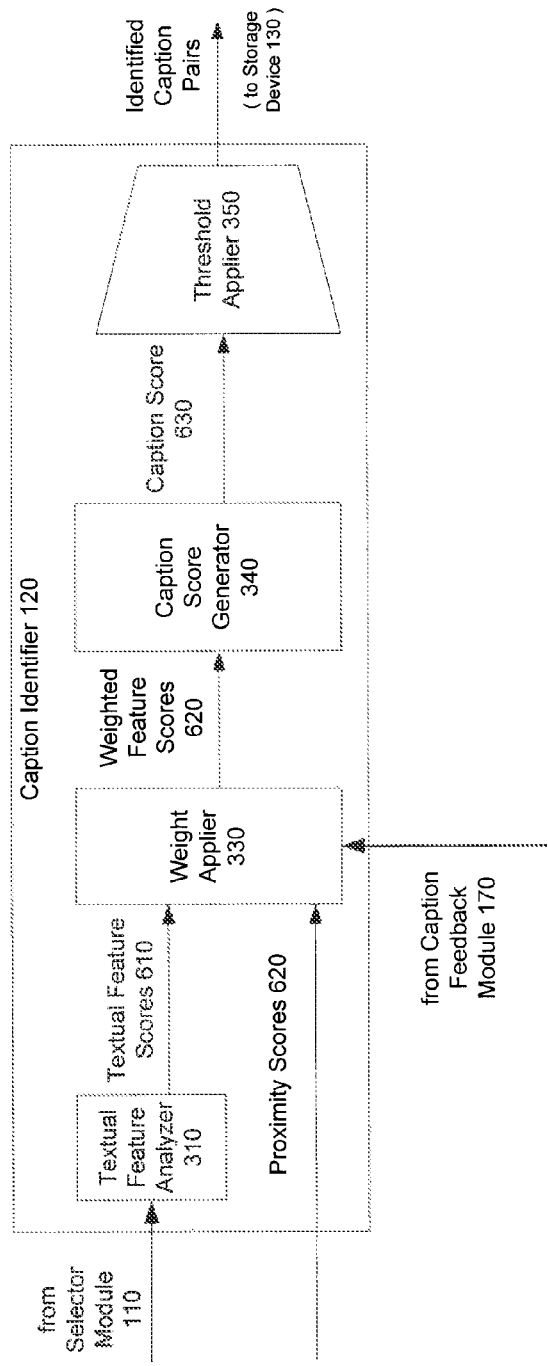
FIG. 6 is an illustration of the data flow within the caption identifier module according to an embodiment of the present invention.
Figure 8:
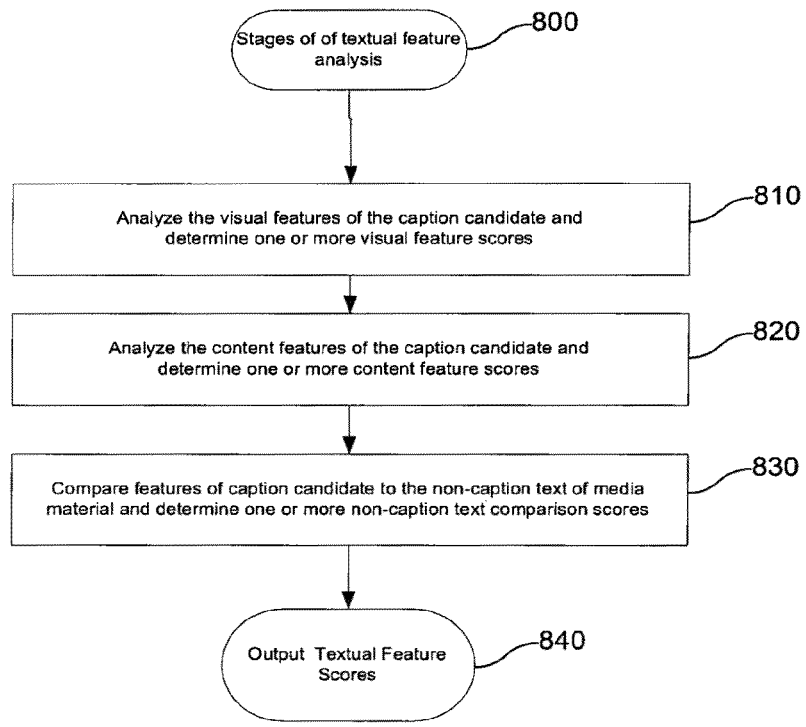
FIG. 8 is a diagram that shows example stages of textual feature analysis, according to an embodiment of the present invention.

FIG. 3 illustrates a more detailed view of the caption identifier module 120 according to an embodiment of the present invention. Caption identifier module 120 includes a textual feature analyzer 310, a weight applier 330, a caption score generator 340 and a threshold applier 350. The caption identifier module 120 shall now be described in greater detail with reference to an example flowchart depicting the basic stages of textual feature analysis 800 as illustrated in FIG. 8, and with reference to a data flow diagram as shown in FIG. 6.

In an embodiment, the textual feature analyzer 310 receives image caption candidate pairs from the selector module 110. As described in the stages of textual feature analysis 800, the textual features of each received caption candidate are analyzed by the textual feature analyzer 310, and one or more scores that relate to the textual features of the caption candidate are generated. In different embodiments, these scores may be varied measures of a feature, e.g., a number, percentage, rating or other type of score.

The features analyzed by textual feature analyzer 310 include the visual features of the text. These visual features relate to the peculiar appearance aspects of the text, and the composition of the text block, e.g., in terms of letters, symbols, numbers and spaces. In an example, as enumerated in stage 810, textual feature analyzer 310 may analyze and quantify the following visual features:

V1. The number of symbols in a text block.
V2. The average font size in a text block.
V3. The percentage of symbols in serif.
V4. The percentage of symbols in sans serif.
V5. The percentage of symbols in monospace.
V6. The percentage of symbols in bold.
V7. The percentage of symbols in italics.
V8. The percentage of symbols underlined in a text block.
V9. The percentage of symbols striked-out in a text block.
V10. The percentage of symbols subscripted in a text block.
V11. The percentage of symbols superscripted in a text block.
V12. The percentage of symbols in caps.
V13. The percentage of symbols in small caps.
V14. The percentage of symbols that are numbers in a text block
V15. The percentage of symbols that are not alphabetic.
V16. The percentage of symbols that are punctuation marks.
V17. The percentage of symbols that are spaces.

This example of features V1-V17 is illustrative and not intended to limit the invention. The Textual feature scores 610 may comprise one or more of the scores based on aspects V1-V17. As would be apparent to a person skilled in the art given this description, other visual aspects, characteristics and features may be used to analyze caption candidates, headings, images and other page features so as to help identify potential captions.

The features analyzed by textual feature analyzer 310 also include the content features of the text. In an example, as enumerated in stage 820, textual feature analyzer 310 may analyze and quantify the following content features of a potential caption:

C1. The number of words in a text block.

C2. The presence of individual caption words and abbreviations, e.g., "figure," "caption," "Fig." in a text block.

C3. The presence of multiword combinations of caption words, e.g., "Caption FIG. 1." Analysis of this feature may also include the analysis of patterns related to context, such as n-word patterns or by context-tree analysis.

C4. The relative placement of one or more figure words in a text block, e.g., "Figure" appears at the end of a block versus at the beginning, or the middle. Analysis of this feature analysis may also include analyzing the pattern induced by word ordering so as to provide additional contextual clues.

This example of features C1-C4 is illustrative and not intended to limit the invention. As would be apparent to a person skilled in the art given this description, other content aspects, characteristics and features may be used to analyze caption candidates, headings, images and other page features so as to identify potential captions.

In additional embodiments, additional textual features may be analyzed. As shown in FIG. 2B, and its describing text herein, media material page 240 includes several different types of page features, e.g., images, captions, body text and headings. In an example, textual feature analyzer 310, or another similar component, analyzes the textual features of these page features, and compares and contrasts them with the caption candidate. For example, in a media material, as with example 241, heading text may be in a different font from body text, emboldened and set off from other parts of the page. These characteristics may be similar to captions in the same media material, as with examples 243, 245. By comparing the textual features of a caption candidate to the non-caption text of media material, as in stage 830, the caption identifier may reduce the likelihood of falsely identifying a heading 241 as a potential caption 243.

It should be noted that in embodiments, conjunctions of individual textual and proximity features may be created to provide additional points of analysis. For example, feature "bold" and feature "5 cm horizontally from image" can be combined as a conjunction, and the conjunction may also have a relevance. In further embodiments these conjunctions of features may have individual scores applied based on their characteristics.

Weight applier 330 may apply weights to the textual feature scores described above, and the proximity feature scores generated by selector module 110. Applying weights to the textual and proximity feature scores creates a combined set of weighted feature scores 620. As discussed above, feature conjunctions may be also analyzed at this weight application phase. The example feature "bold" and feature "5 cm horizontally from image" conjunction may have a different weight applied based on the combination.

Varying weights may be given to each feature score based on thresholds and confidence levels associated with each attribute. A confidence level may be based on a variety of factors including, for example, the likelihood that a feature is indicative of a caption. In an example, different sets of feature weights may be applied for each type of media material examined, based on the varying significance of different features for that type of material, e.g., a type of book always labels its captions as starting with "Fig.," a magazine generally places its captions below, and to the right of the image, a treatise places its image captions above an image, and has generally has caption type set in boldface italics. In an embodiment, the weight applier 330 may output a combined set of weights to be used, as described below, to generate a caption score 630.

In further embodiments, caption score generator 340 may use the combined set of weighted feature scores 620, to produce a caption score 630 for each compared caption candidate/image pair. In an example, this caption score 630 is a weighted linear combination of the feature scores described above, and may be any representation relating to how likely it is that a candidate caption of an image is a caption of that image. In a further example, the confidence score may be a normalized weighted linear combination of the feature scores. One of skill in the art will recognize that the confidence score may have a different range, may be a vector, or may be determined from a different type of algorithm without departing from the spirit and scope of the present invention. Example Equations:

In an embodiment, the caption score 630 for each identified image-caption candidate pair is based on the following equation:

$$\text{Caption Score} = \text{page\_boost} + \text{decay\_factor} * ((\% \text{serif} + \% \text{sans\_serif} + \% \text{monospace})/3 + (\% \text{bold} + \% \text{italic} + \% \text{underlined} + \% \text{strikeout})/4 + (\% \text{subscript} + \% \text{superscript})/2 + (\% \text{caps} + \% \text{small\_caps})/2 + (4 - \% \text{numeric} - \% \text{nonalpha} - \% \text{punct} - \% \text{space})/4 + \text{proximity\_score})/6 \quad \text{Equation (1)}$$

In this example, the textual feature variables above are defined as follows: % serif is set equal to the percentage of serif font characters contained in a caption candidate, % sans_serif is set equal to the percentage of sans serif font characters contained in a caption candidate, % monospace is set equal to the percentage of monospace (e.g., non-proportional, fixed-width) font characters contained in a caption candidate, % bold is set equal to the percentage of bold font characters contained in a caption candidate, % italic is set equal to the percentage of italicized font characters contained in a caption candidate, % underlined is set equal to the percentage of underlined font characters contained in a caption candidate, % strikeout is set equal to the percentage of strikeout font characters (e.g., font characters with a single line horizontally down the center) contained in a caption candidate, % subscript is set equal to the percentage of subscript font characters contained in a caption candidate, % superscript is set equal to the percentage of superscript font characters contained in a caption candidate, % caps is set equal to the percentage of capitalized (uppercase) characters contained in a caption candidate, % small_caps is set equal to the percentage of characters in small caps (e.g., typically capitalized (uppercase) characters set at the same height as surrounding non-capitalized (lowercase) letters) contained in a caption candidate, % numeric is set equal to the percentage of numeric characters contained in a caption candidate, % nonalpha is set equal to the percentage of non-alphanumeric characters contained in a caption candidate, % punct is set equal to the percentage of punctuation characters contained in a caption candidate, % space is set equal to the percentage of space characters contained in a caption candidate. Note in the example above, that textual feature values are normalized by treating such values as percents.

In the example equation (1) above, page_boost is used to favor image caption candidate pairs that are on the same page. In an example, this page_boost value is proportional to the total of page distance between the identified image and the caption candidate. Also, in the formula above, the decay_factor is used to modify the caption score of a caption candidate based on the number of words in the caption candidate. In this example, decay_factor is set as follows, where word_length is set equal to the number of words in the caption candidate:

decay_factor=1 if word_length>=5 and word_length<=14 decay_factor=word_length/100 if word_length<5 decay_factor=0.1−(word_length−60)/100 if word_length>=15 and word_length<30 decay_factor=0.0001 if word_length>=30

Essentially, in this example, decay_factor discounts the caption score value for text blocks that are too long or too short.

The example equation (1) and decay factor settings above are illustrative and not intended to limit the invention. Other features, equations, formulae, variables, factors, approaches, may be used to analyze the content features of text blocks as would be apparent to a person skilled in the art given this description.

Identifying Captions and Storing

In an embodiment, the threshold applier 350 is configured to aggregate identified caption pairs from media pages having a caption score that exceeds a caption score threshold. In an example, this threshold score may be adjusted to change the output results of the captioner. The aggregated identified caption pairs may be stored in storage device 130 for further use, as is shown generally in stage 1030. In different embodiments, the identified caption pairs may be directly stored without applying a threshold.

Feedback

Figure 4:
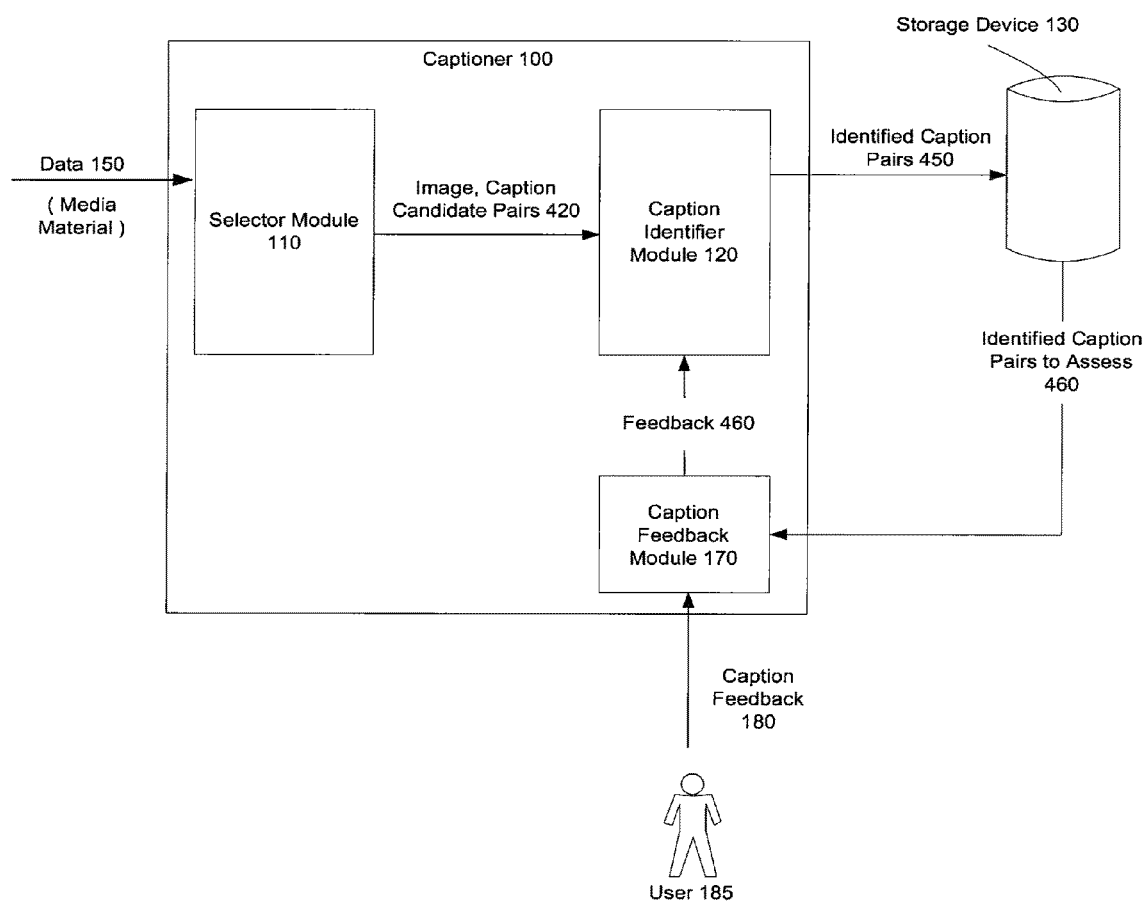
FIG. 4 is an illustration of the data flow within the captioner according to an embodiment of the present invention.

As shown in FIG. 4, and as mentioned above, captioner 100 may include caption feedback module 170 that collects and processes feedback associated with identified caption pairs to assess 460. This set of identified caption pairs to assess 460 may include a portion of the stored determined caption pairs. Manual or automatic techniques may be used to select the identified caption pairs to assess 460. For example, feedback regarding the data output 100 may be provided, and the results of this feedback may be used to modify the analysis performed by captioner 100. For example, feedback regarding the identified caption pairs to assess 460 may be provided, and the results of this feedback may be used to modify the analysis performed by captioner 100, an embodiment of this function described herein at stages 1040 and 1050.

To generate feedback 470, for example, a feedback user 410 may interact with captioner 100 through caption feedback module 170 to review identified caption pairs to assess 460. For example, through an interface, a user may select positive and negative examples of identified captions paired with an image in a given media material, and this feedback 470

In an embodiment, feedback 470 may be sent to the caption identifier module 120 to improve the caption identification processing. An example embodiment of this feature are shown in FIGS. 7B, 7C, 7D where a block diagram showing a determined caption image pair is presented to a user. In the respective figures, paired Image 761 and caption 762 are highlighted in the user interface with a thick line. Note in the example at FIG. 7B, there is potentially a portion of the caption 763 that was not identified. This type of result is expected from embodiments, and this feedback stage takes this incomplete result into account. In this example, feedback User 410 is requested to give the following feedback to the example shown in FIG. 7B: "YES—press Y, NO—press N and UNKNOWN—press U." Further instructions may be given to a user to assist in making the above choice:

The general rules to follow are:

If picture detection is good, and caption detection is good, and finally the caption detected is related to the picture, an answer is YES.

If picture detection is bad, most of the time an answer is NO.

If caption detection is bad, most of the time an answer is NO.

If picture detection is good, and caption detection is good, but caption is vaguely related to the picture, an answer could be UNKNOWN.

If picture detection is good, and caption detection is good, and caption is mostly related to the picture, an answer is YES.

Tables, if properly enclosed in an image box, may be considered good picture detections.

In the case where it is in a foreign language, a user may use their best judgment by looking at the layout, symbol, font differences, to see if it looks like a caption. The user may only select UNKNOWN when they are really unsure about their decision.

This example of instructions is illustrative and not intended to limit the invention.

As would be apparent to a person skilled in the art given this description, other instructions might be added or removed depending upon the user.

It is also possible, for example, to automatically provide feedback regarding determined caption pairs using machine learning techniques. As would be apparent to a person skilled in the art given this description, different methods of using feedback to improve caption matching could be used, e.g., neural networks. In another embodiment, a quality assurance application 722 or user feedback interface may be used to present the image/caption pairs and collect the user feedback.

Figure 7A:
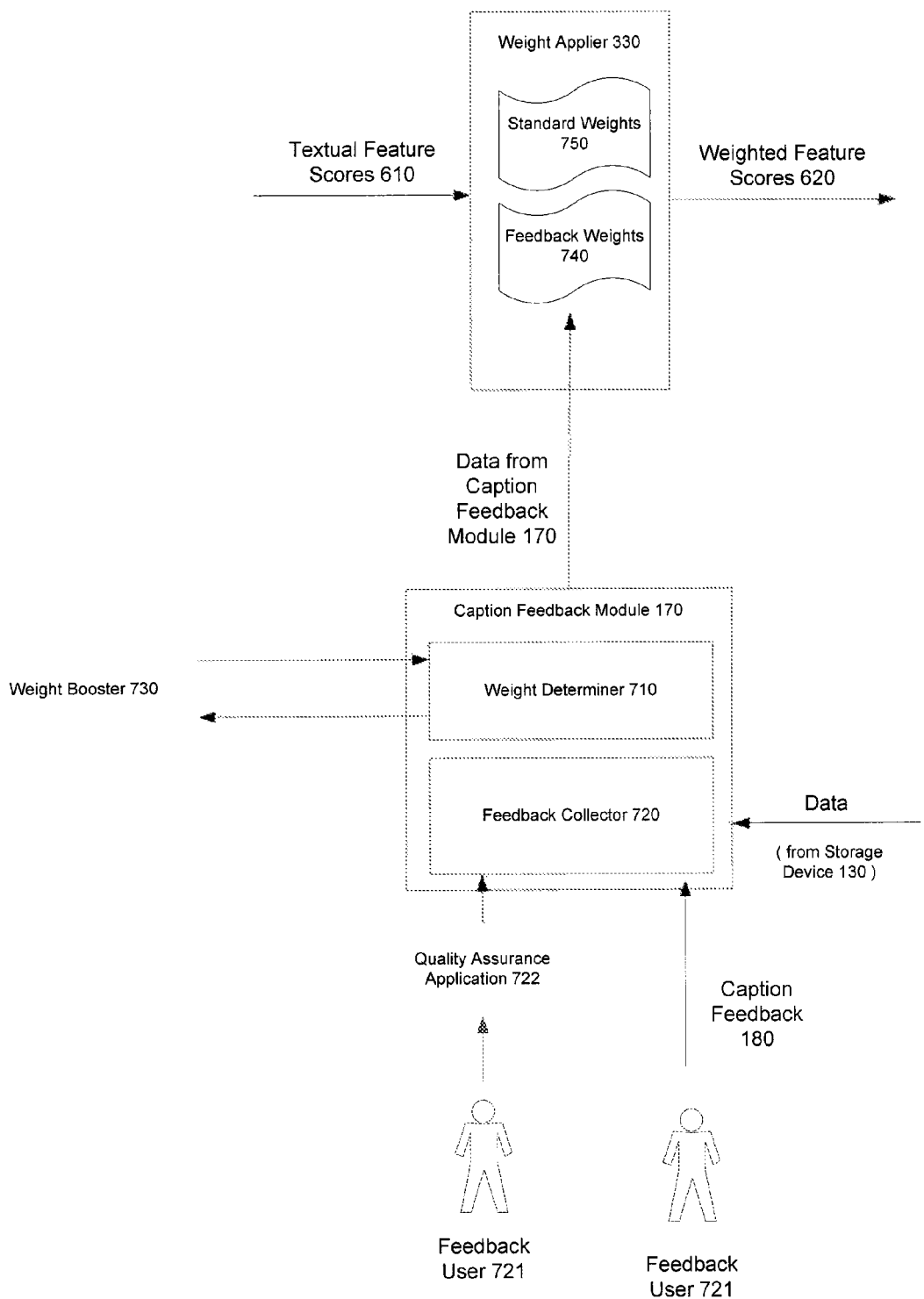
FIG. 7A is a diagram of the data flow within the caption feedback module according to an embodiment of the present invention.
Figure 7B:
FIG. 7B is a diagram of potential image caption pairs according to an embodiment of the present invention.
Figures 7C, 7D:
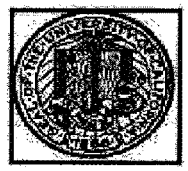
FIG. 7C is a diagram of potential image caption pairs according to an embodiment of the present invention.
FIG. 7D is a diagram of potential image caption pairs according to an embodiment of the present invention.

FIG. 7A illustrates a more detailed view of how the caption feedback module 170 may interact with other aspects of embodiments. In this example, initially, the textual feature scores generated by the textual feature analyzer 310 and the proximity feature scores generated by the proximity feature analyzer 230 may be weighted using standard weights 750. However, after an initial execution of the captioner, the determined image caption pairs may be analyzed, and a feedback collector 720 may receive caption feedback 180 on these matches, as is shown in stage 1040. A weight determiner 710 is then able to determine different feedback weights 740 to be used by the weight applier 330 in advance of the caption score generator 340. In an example, this feedback loop may be used one or more times to calibrate and increase the feedback weights 740, thereby increasing the accuracy of the caption identification, as is shown in stage 1050.

In a further embodiment, it should be recognized that a weight booster 730 may use any combination of many adaptive boosting approaches, as would be apparent to a person skilled in the relevant art, to further increase the usefulness of the caption feedback 180. The weight booster 730 uses a boosting algorithm to generate modified feedback weights that may impart an improved level of accuracy over feedback weights that are not so boosted. In an example, the weight booster 730 may use a Martingale Boosting approach to create a weight model based on a weighted linear combination of the analyzed features.

Example Computer System Implementation

Captioner 100 and its associated modules, stages, processes and methods described in embodiments herein for identifying captions in media material, may be implemented by software, firmware, hardware, or a combination thereof—as represented in FIG. 1A by computing device 105. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.' FIG. 11 illustrates an example computer system 1100 in which embodiments of the present invention, or portions thereof, may be implemented as computer-readable code. For example, captioner 100 of FIG. 1A, carrying out stages of method 1000 of FIG. 10, and captioner 100 with caption feedback module 170 of FIG. 1B, may be implemented in system 1100. Various embodiments of the invention are described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 1100 includes one or more processor devices, such as processor device 1104. Processor device 1104 may be a special purpose or a general purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network or multi-core message-passing scheme.

Computer system 1100 also includes a main memory 1108, for example, random access memory (RAM), and may also include a secondary memory 1110. Secondary memory 1110 may include, for example, a hard disk drive 1112 and/or a removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the stages in the method illustrated by flowchart 1000 of FIG. 10 discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail may be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented captioner for analyzing data representative of image captions in media material, comprising:
    a text block detector configured to identify text-blocks in a media material;
    an image detector configured to identify images in the media material;
    a proximity feature analyzer configured to analyze the location of the text-blocks relative an image in the media material;
    a caption identifier module configured to identify potential captions associated the identified image images based, in part, on at least one of the results from the proximity feature analyzer;
    a textual feature analyzer configured to analyze textual features of a potential caption, resulting in a textual feature score;
    an image feature analyzer configured to analyze features of the identified image, resulting in an image feature score, wherein the proximity feature analyzer is further configured to analyze the proximity features of at least one potential caption relative to one or more identified images, resulting in at least one proximity feature score;
    a weight applier configured to apply weights to one or more scores from the proximity feature analyzer, textual feature analyzer and image feature analyzer, resulting in one or more weighted scores;
    a caption score generator configured to generate a probability score that the potential caption is linked to the identified image based on at least one of the results of the weight applier;
    a caption feedback module configured to receive user feedback about at least one of the potential captions;
    a caption identifier module configured to determine, based on the received user feedback and the probability score, that at least one potential caption has a linkage to an identified image, and is an actual caption of the identified image; and
    a linkage storer configured to store information corresponding to the linkage between the actual caption and the associated identified image, the storage of information corresponding to the linkage being limited based on a threshold applied to the probability score.

2. The computer-implemented captioner of claim 1, wherein the textual features analyzed by the textual feature analyzer include visual features of the text.

3. The computer-implemented captioner of claim 1, wherein the textual features analyzed by the textual feature analyzer include content features of the text.

4. A non-transitory computer-readable medium having computer program code recorded thereon that, when executed by a processor, causes the processor to perform a method for analyzing data representative of image captions, the method comprising,
    (a) identifying text-blocks in a media material;
    (b) identifying images in the media material;
    (c) analyzing the location of the text-blocks relative to the images in the media material;
    (d) identifying potential captions associated with images based, in part, on at least one of the results from stage (c);
    (e) analyzing textual features of at least one potential caption, resulting in at least one textual feature score;
    (f) analyzing features of at least one identified image, resulting in at least one image feature score;
    (g) analyzing the proximity features of at least one potential caption relative to one or more identified images, resulting in at least one proximity feature score;
    (h) applying weights to one or more scores from stages (e)-(g), resulting in one or more weighted scores;
    (i) generating a probability score that at least one potential caption is linked to one or more images based on at least one of the weighted scores from stage (h);
    (j) receiving user feedback about at least one of the potential captions;
    (k) determining, based on the received user feedback and the probability score, that at least one potential caption has a linkage to an identified image, and is an actual caption of the identified image; and
    (l) storing information corresponding to the linkage between the actual caption and the associated identified image, wherein storing information corresponding to the linkage is limited based on a threshold applied to the probability score associated with the linkage.

5. A computer program product comprising:
    a non-transitory computer usable storage medium having computer readable program code embodied therein for causing a processor to execute the computer readable program code, the computer readable program code comprising:
    (a) computer readable program code configured to cause the processor to identify text-blocks in a media material;
    (b) computer readable program code configured to cause the processor to identify images in the media material;
    (c) computer readable program code configured to cause the processor to analyze the location of the text-blocks relative to the images in the media material;
    (d) computer readable program code configured to cause the processor to identify potential captions associated with images based, in part, on at least one of the results from stage (c);
    (e) computer readable program code configured to cause the processor to analyze textual features of at least one potential caption, resulting in at least one textual feature score;
    (f) computer readable program code configured to cause the processor to analyze features of at least one identified image, resulting in at least one image feature score;
    (g) computer readable program code configured to cause the processor to analyze the proximity features of at least one potential caption relative to one or more identified images, resulting in at least one proximity feature score;
    (h) computer readable program code configured to cause the processor to apply weights to one or more scores from stages (e)-(g), resulting in one or more weighted scores;
    (i) computer readable program code configured to cause the processor to generate a probability score that at least one potential caption is linked to one or more images based on at least one of the weighted scores from stage (h);

(j) computer readable program code configured to cause the processor to receive user feedback about at least one of the potential captions;

(k) computer readable program code configured to cause the processor to determine, based on the received user feedback and the probability score, that at least one potential caption has a linkage to an identified image, and is an actual caption of the identified image; and;

(l) computer readable program code configured to cause the processor to store information corresponding to the linkage between the actual caption and the associated identified image, wherein the storage of information corresponding to the linkage is limited, based on a threshold applied to the probability score associated with each linkage.

6. A computer-implemented method of identifying captions in media material, comprising:
(a) identifying text-blocks in a media material;
(b) identifying images in the media material;
(c) analyzing the location of the text-blocks relative to the images in the media material;
(d) identifying potential captions associated with images based, in part, on at least one of the results from stage (c);
(e) analyzing textual features of at least one potential caption, resulting in at least one textual feature score;
(f) analyzing features of at least one identified image, resulting in at least one image feature score;
(g) analyzing the proximity features of at least one potential caption relative to one or more identified images, resulting in at least one proximity feature score;
(h) applying weights to one or more scores from stages (e)-(g), resulting in one or more weighted scores;
(i) generating a probability score that at least one potential caption is linked to one or more images based on at least one of the weighted scores from stage (h);
(j) receiving user feedback about at least one of the potential captions;
(k) determining, based on the received user feedback and the probability score, that at least one potential caption has a linkage to an identified image, and is an actual caption of the identified image; and
(l) storing information corresponding to the linkage between the actual caption and the associated identified image, wherein storing information corresponding to the linkage is limited based on a threshold applied to the probability score associated with the linkage.

\* \* \* \* \*

UNITED STATES PATENT AND TRADEMARK OFFICE
CERTIFICATE OF CORRECTION

| | | |
|---|---|---|
| PATENT NO. | : 8,208,737 B1 | Page 1 of 1 |
| APPLICATION NO. | : 12/425500 | |
| DATED | : June 26, 2012 | |
| INVENTOR(S) | : Eugene Ie | |

It is certified that error appears in the above-identified patent and that said Letters Patent is hereby corrected as shown below:

In the Claims

Column 15
Line 25, Claim 1, please replace "relative an image" with --relative to an image--.

Column 15
Line 28, Claim 1, please replace "associated the identified image images based" with --associated with the identified image based--.

Column 17
Line 11, Claim 5, please replace "and;" with --and--.

Signed and Sealed this
Thirtieth Day of April, 2013

Teresa Stanek Rea
*Acting Director of the United States Patent and Trademark Office*